United States Patent
Manzano

(10) Patent No.: US 7,614,059 B2
(45) Date of Patent: Nov. 3, 2009

(54) SYSTEM AND METHOD FOR THE DISCOVERY AND USAGE OF LOCAL RESOURCES BY A MOBILE AGENT OBJECT

(75) Inventor: Michael R. Manzano, Seattle, WA (US)

(73) Assignee: Topia Technology, Tacoma, WA (US)

( * ) Notice: Subject to any disclaimer, the term of this patent is extended or adjusted under 35 U.S.C. 154(b) by 850 days.

(21) Appl. No.: 10/617,604

(22) Filed: Jul. 11, 2003

(65) Prior Publication Data

US 2004/0010590 A1 Jan. 15, 2004

Related U.S. Application Data

(60) Provisional application No. 60/395,477, filed on Jul. 11, 2002.

(51) Int. Cl.
G06F 3/00 (2006.01)
G06F 9/44 (2006.01)
G06F 9/46 (2006.01)
G06F 13/00 (2006.01)
G06F 15/00 (2006.01)
G06F 15/16 (2006.01)

(52) U.S. Cl. .................. 719/315; 719/316; 719/317; 712/28; 709/201; 709/202

(58) Field of Classification Search ......... 719/315–317; 712/28; 709/201–202
See application file for complete search history.

(56) References Cited

U.S. PATENT DOCUMENTS 6,016,393 A * 1/2000 White et al. ............... 719/315
6,473,781 B1 * 10/2002 Skagerwall et al. ......... 709/201
6,662,207 B2 * 12/2003 Kawamura et al. ......... 709/202
6,789,077 B1 * 9/2004 Slaughter et al. ............ 707/10
6,850,979 B1 * 2/2005 Saulpaugh et al. ......... 709/225
6,862,594 B1 * 3/2005 Saulpaugh et al. ........... 707/10
6,868,447 B1 * 3/2005 Slaughter et al. ........... 709/225
6,922,685 B2 * 7/2005 Greene et al. ................. 707/1
6,970,869 B1 * 11/2005 Slaughter et al. ............ 707/10
6,970,902 B1 * 11/2005 Moon ........................ 709/201
7,016,966 B1 * 3/2006 Saulpaugh et al. ......... 709/230
7,080,078 B1 * 7/2006 Slaughter et al. ............ 707/10
7,089,295 B2 * 8/2006 Christfort et al. ........... 709/219
2002/0184403 A1 * 12/2002 Dahlin et al. ............... 709/316
2004/0205772 A1 * 10/2004 Uszok et al. ................ 719/317

OTHER PUBLICATIONS

Li, et al., "Combine concept of agent and service to build distributed object-oriented system", Aug. 5, 2001, Elsevier Science, pp. 161-171.*

(Continued)

Primary Examiner—Hyung S Sough
Assistant Examiner—Qing-Yuan Wu
(74) Attorney, Agent, or Firm—Black Lowe & Graham PLLC

(57) ABSTRACT

A method is presented for a mobile agent object to discover services available in a host-computing environment. According to an embodiment of this method, the mobile agent object requests a service listing from the host environment. The host environment returns a service listing to the mobile agent object in response to the request for the service listing. The mobile agent object then determines if a particular service is within the returned service listing and requests the particular service if the particular service is determined by the mobile agent object to be within the returned service listing.

27 Claims, 4 Drawing Sheets

OTHER PUBLICATIONS

Barbeau, "Service discovery in a mobile agent API using SLP", 1999, IEEE, pp. 391-395.*

META Group; Loose Leaf Manual; Mobile Agent Technology and Market Positioning; Feb. 2001; pp. 2-31.

* cited by examiner

SYSTEM AND METHOD FOR THE DISCOVERY AND USAGE OF LOCAL RESOURCES BY A MOBILE AGENT OBJECT

CROSS REFERENCE TO RELATED APPLICATION

This application claims the benefit of copending Provisional Patent Application Ser. No. 60/395,477 filed Jul. 11, 2002 entitled "Method for the Discovery and Usage of Local Resources by Mobile Agents."

TECHNICAL FIELD OF THE INVENTION

The present invention relates, generally, to a distributed computing environment wherein processes created in an object-oriented environment direct their own movement throughout a computer network, and, in particular, relates to the discovery and usage of services within host-computing environments and to the auditing of this discovery and usage.

BACKGROUND OF THE INVENTION

The advent of computer networks has proliferated the use of distributed-computing environments. A distributed-computing environment is a type of computing wherein several computer platforms, i.e., different computers, coupled by a network, perform separate but related tasks, (called a process), that are directed in concert toward a single achievement. One example of such a process is the retrieval of all files in a network having the same pattern of letters in the file name. By taking advantage of the computing power of several computers at once, tasks require less time for completion. Use of a processor close to resources to be processed reduces total computing resource requirements.

One method known in the art for practicing a distributed-computing environment is called "remote programming." In remote programming, a first executing program, called a client process, executing on a first computer system, sends to a second process, called a server process executing on the second computer system, a list of instructions. The instructions are then carried out on the second computer system by the server process, effectuating the goal of the client process. The instructions which the server process is designed to carry out must have some degree of generality, i.e., the instructions must allow some degree of local decision-making with respect to details.

U.S. Pat. No. 6,016,393 to White et al., entitled, "System and Method for Distributed Computation Based upon the Movement, Execution, and Interaction of Processes in a Network", which is hereby incorporated by reference, disclosed a system that improved upon the concept of remote programming by utilizing processes called mobile agents (sometimes referred to as mobile objects or agent objects). The system described by White et al., provides the ability for an object (the mobile agent object), existing on a first ("host") computer system, to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded", to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects. The operations, often called services, permitted to the mobile agent object are limited by a "permit" according to White et al. A permit limits the particular capabilities of a particular mobile agent object on particular occasions. The permit for a mobile agent object specifies which of several of the services defined for the mobile agent object can or cannot be performed. The permit further limits the amount of processing resources the mobile agent object can consume and the time at which the mobile agent object expires. Additionally, the permit specifies the priority of execution of the mobile agent object relative to other objects.

The permit, however, cannot determine or define the nature of the host-computing environment within which the mobile agent object is executing. That is, before the mobile agent object is able to do anything, it would be beneficial to discover what services are available in a host-computing environment. A mobile agent object unable to discover the services that are available would simply try all services in an effort to determine if the host-computing environment even has the particular service or will allow the mobile agent object access to the service if it does exist. This is wasteful of computing time and power. Thus, a uniform method for service discovery by the mobile agent object within the host-computing environment is desirable.

Furthermore, in addition to using a permit to limit the abilities of a mobile agent object, a uniform method for auditing service usage by the mobile agent object is desirable. In this manner, statistics regarding the host-computing environment can be generated as well as provisions for an audit trail for intrusion detection software.

SUMMARY OF THE INVENTION

According to an embodiment of the invention, a system and method is presented for a mobile agent object to discover services available in a host-computing environment. In this method, the mobile agent object requests a service listing from the host-computing environment. The host-computing environment returns a service listing to the mobile agent object in response to the request for the service listing. The mobile agent object then determines if a particular service is within the returned service listing and requests the particular service if the particular service is determined by the mobile agent object to be within the returned service listing.

According to another embodiment of the invention, a system and method for auditing service events in a host-computing environment is presented. In this method, an auditing system is able to audit service events from a mobile agent object by detecting a request for a service by the mobile agent object. Then, the audit system generates an audit event in response to detecting the request and logs the audit event in a database.

In the description of this art, the terms "host", "host-computing environment" and "mobile-agent runtime environment" are used synonymously. The phrase "a mobile-agent runtime environment" is used in place of the phrase "a place" as used by White, et al.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
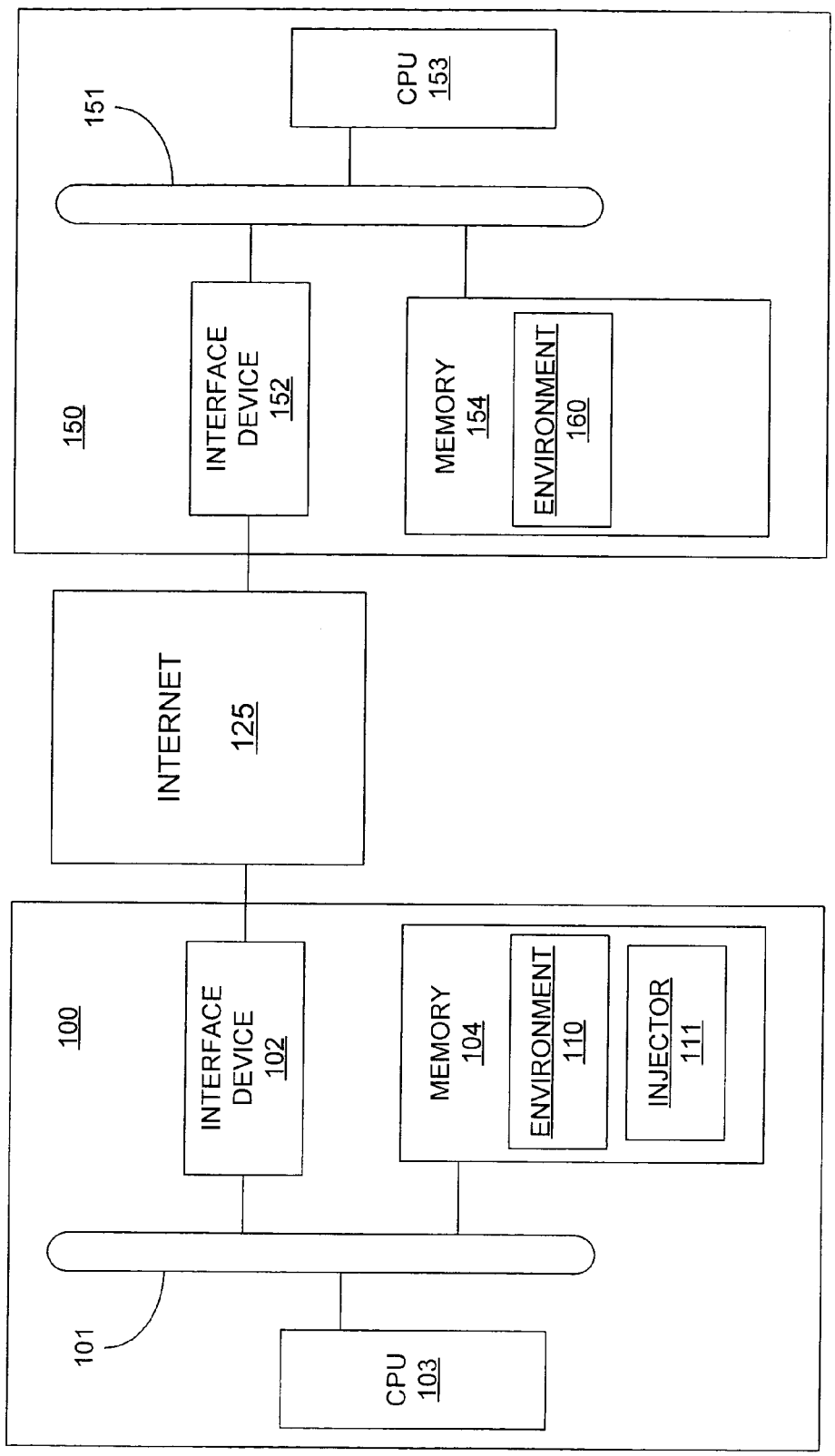
FIG. 1 is a block diagram of one embodiment of distributed-computing environment suitable for practicing embodiments of the invention.

FIG. 1 is a block diagram of a distributed-computing environment suitable for practicing embodiments of the invention. The distributed-computing environment includes a first computer system 100 and a second computer system 150 that are coupled by a network connection, such as the internet 125 as shown in FIG. 1. The network connection may be any other connection, such as a Local Area Network (LAN) for example, that is suitable for facilitating communication between computer systems. Here, the first 100 and second 150 computer systems may communicate over the internet 125 using a standard protocol, such as, for example, Transmission Control Protocol/Internet Protocol (TCP/IP). Additionally, there are typically many more computer systems (not shown) coupled with the internet 125, all of which may communicate with other computers on the network including the first and second computers 100 and 150.

The first computer system 100 includes a CPU 103 coupled to a bus 101 that facilitates communication between the CPU 103 and other components of the computer 100. Other components of the computer 100 include a Network Interface Component 102 (NIC) and a memory 104. The memory may include magnetic or optical disks, Random-Access memory (RAM), Read-Only memory (ROM), Basic Input/Output Systems (BIOS), or any other commonly known memory system used in computer architecture. In the first computer 100, a mobile-agent runtime environment 110 and a mobile agent injector program 111 are resident within the memory 104. Although shown as separate memory components, the mobile-agent runtime environment 110 and a mobile agent injector program 111 may reside in a single memory component or in any combination of memory components that are coupled with the bus 101. The NIC 102 facilitates communications between the first computer 100 and other computers, such as the second computer 150, via the internet 125.

The second computer 150 is similar to the first computer 100 and includes a CPU 153, a bus 151, a NIC 152, and a memory 154 which includes a mobile-agent runtime environment 160. These components are organized and coupled as described above with respect the first computer 100.

The above-described distributed-computing environment may host one or more mobile agent objects (not shown) that are present in one of the mobile-agent runtime environments 110 or 160 of one of the computers 100 or 150. The mobile-agent runtime environment 110 and 160 is a portion of the memory dedicated to allowing a mobile agent object the ability to perform operations that it was programmed to carry out. The nature of the mobile agent object, the manner in which the mobile agent object is transported between computers, and the parameters of the mobile agent object's abilities are discussed in detail in White et al. (which has been incorporated by reference) and will not be discussed further herein.

Mobile agent objects may be instantiated in a mobile-agent runtime environment 110 or 160 in several ways, two of which are briefly described here. In a first way, the mobile agent object is locally created in the first computer 100 and then locally injected into the mobile-agent runtime environment 110 by the mobile agent injector program 111. In a second way, the mobile agent object moves from the mobile-agent runtime environment 110 of the first computer system 100 to the mobile-agent runtime environment 160 of the second computer system 150 over the internet 125 by its own accord, i.e., according to its programmed instructions. Both of these instantiation processes are well known in the prior art.

Figure 2:
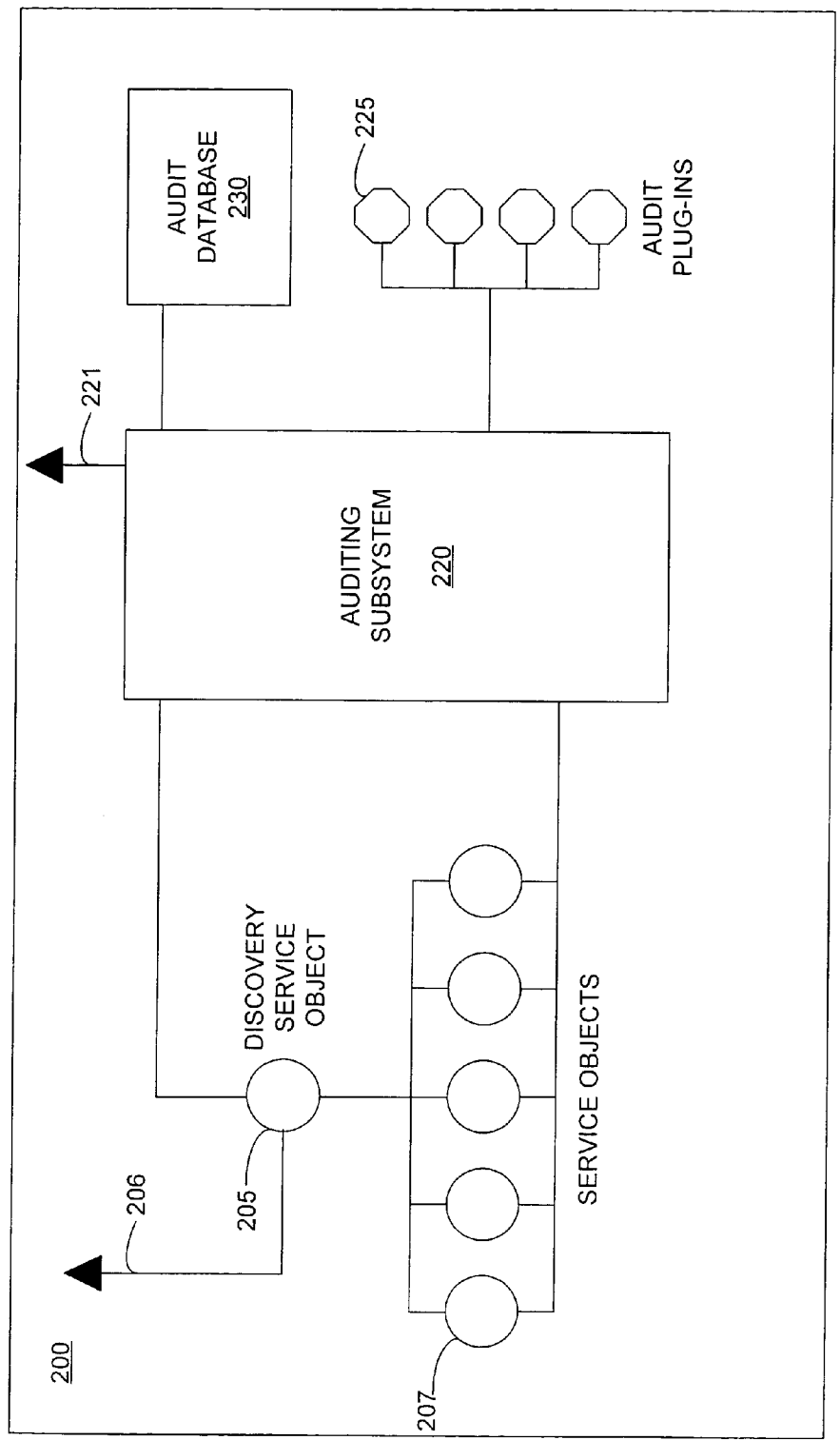
FIG. 2 is a block diagram of a mobile-agent runtime environment which may reside in any memory system of any computing environment according to an embodiment of the invention.

FIG. 2 is a block diagram of a mobile-agent runtime environment 200 which may reside in any memory system of any computing environment, such as the mobile-agent runtime environment 110 of the memory 104 in the computer 100 shown in FIG. 1. The mobile-agent runtime environment 200 provides a platform for the mobile agent object wherein the mobile agent object is provided an interface for accessing services within the host-computing environment. The mobile-agent runtime environment 200 exists in a host-computing environment and may be aided by the operating system of the host computer system.

In one embodiment of the invention, a mobile-agent runtime environment includes objects used during discovery of services. Thus, the mobile-agent runtime environment 110 further includes a directory service object 205 that provides an Application Programming Interface (API) 206 for communicating with the central processing unit of the host-computing environment with which a mobile agent object can use the directory service to discover services hosted within a mobile-agent runtime environment 200. The mobile-agent runtime environment 110 also includes a plurality of service objects 207, each of which conforms to a specific service API (not shown individually) or service protocol.

In another embodiment of the invention, in addition to the entities involved with service discovery as described above, the following entities, also depicted in FIG. 2, are used to implement a system for auditing service usage within a host-computing environment.

An auditing subsystem 220 provides an API 221 for logging audit events into an audit database 230. The auditing subsystem 220 also provides various auditing plugins 225 access to the data in the audit database 230 as well as a notification system with which auditing plugins 225 can be notified of events in the auditing subsystem 220. The audit database 230 stores auditing event entries. The audit database 230 may be implemented with any database that is capable of storing string-type information. Each of the plurality of auditing plugins 225 is operable to interact with the API 221 provided by the auditing subsystem 220. The auditing plugins 225 may provide a method for extending the capabilities of the auditing subsystem 220 to other computing environments.

The operations of the directory and auditing systems are described with respect to FIGS. 3 and 4 below.

Figure 3:
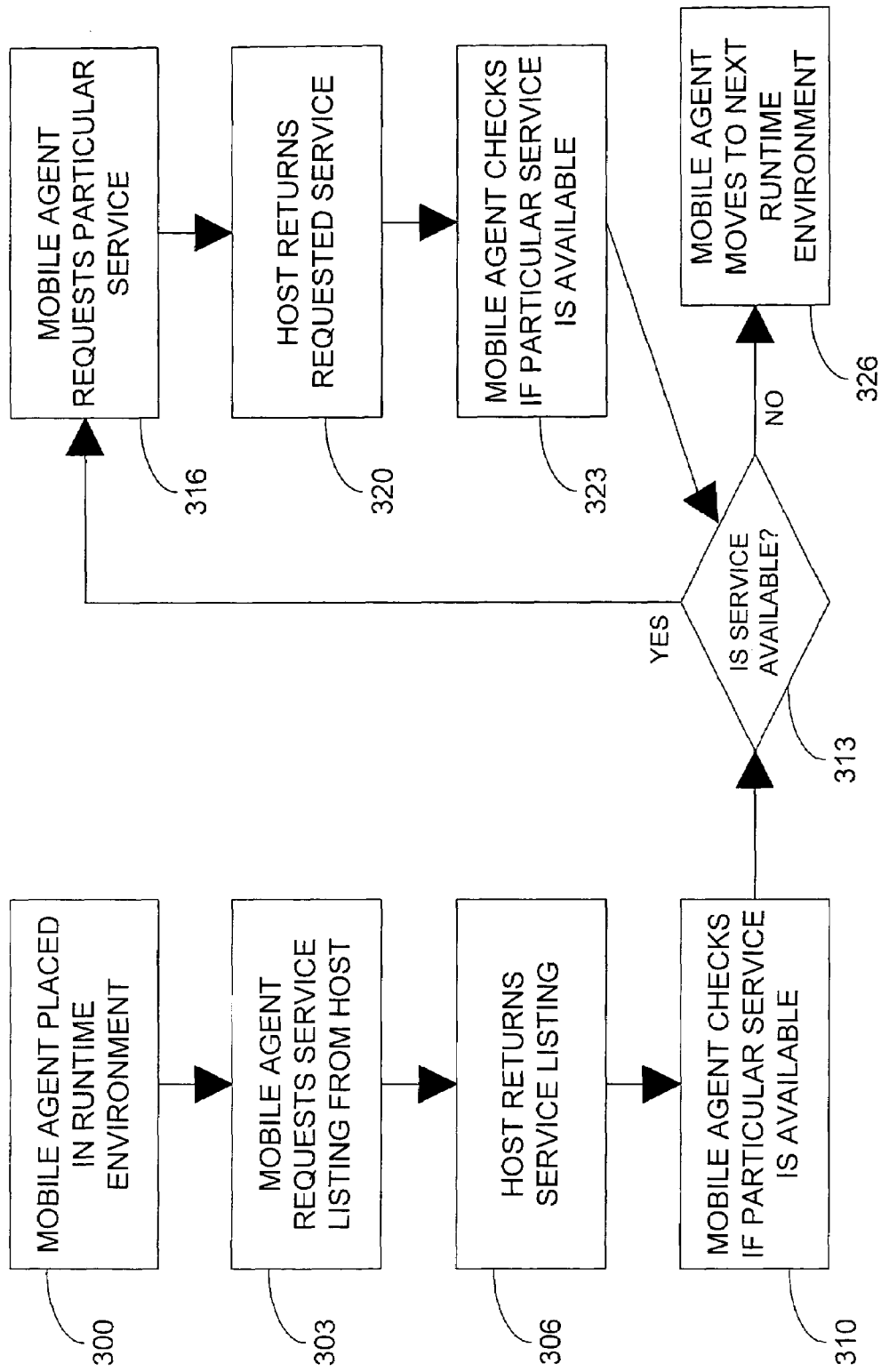
FIG. 3 is a flow diagram of a method for discovering services in a host-computing environment according to an embodiment of the invention.

FIG. 3 is a flow diagram of a method for discovering services available to a mobile agent object in a mobile-agent runtime environment 200 according to an embodiment of the invention. After the mobile agent object is instantiated, in step 300, within a mobile-agent runtime environment 200, an object-oriented software object is presented to the mobile agent object, either as a stage of the mobile-agent-object instantiation, or by calling the software object to the mobile-agent object itself. As such, the initial software object is called the directory service object 205 (FIG. 2) and the mobile agent object requests a service listing from the directory service object 205 in step 303.

The directory service object 205 provides the mobile agent object an API 206 for discovering software services provided in the particular mobile-agent runtime environment 200. The service listing is returned at step 306 and represents the particular API 206 or protocol provided by the directory service object 205. Services listed in the service listing may represent any software process or object in the mobile-agent runtime environment 200. In fact, each software process or object represented in the service listing may differ between two different mobile-agent runtime environments 200. The service listing simply represents a language which the mobile agent object may use to communicate with a software process or object provided by the host-computing environment through the particular mobile-agent runtime environment 200.

The service listing is returned to the mobile agent object in the form of a descriptive list. Each entry in the list contains the name of the service and the version of the service protocol. The mobile agent object iterates through, at step 310, the service list to ensure the protocols it wishes to use are available. The mobile agent object may change its behavior depending on which services are available in any particular mobile-agent runtime environment 200. This decision is represented at step 313.

If a particular service is available, the mobile agent object issues a request to the directory service object 205 by asking for the service object 207 conforming to a specific version of the service protocol, at step 316. The directory service object 205 then returns the service object 207 that conforms to the requested version of the requested service protocol at step 320. At this point, the mobile agent object may use the returned service object 207 to execute instructions as directed by the programming of the mobile agent object. At this point, the mobile agent object may terminate its execution, or may return to the environment from which it came, or move to another host environment, or may take additional steps described below.

At step 323, the mobile agent object may check to see if another service is available that is of interest to the mobile service object. The method then loops back to the decision block at step 313. If another service object is available, then the method repeats as described above. If the requested service object is not available, then the mobile agent object may move to another mobile-agent runtime environment at step 326.

Figure 4:
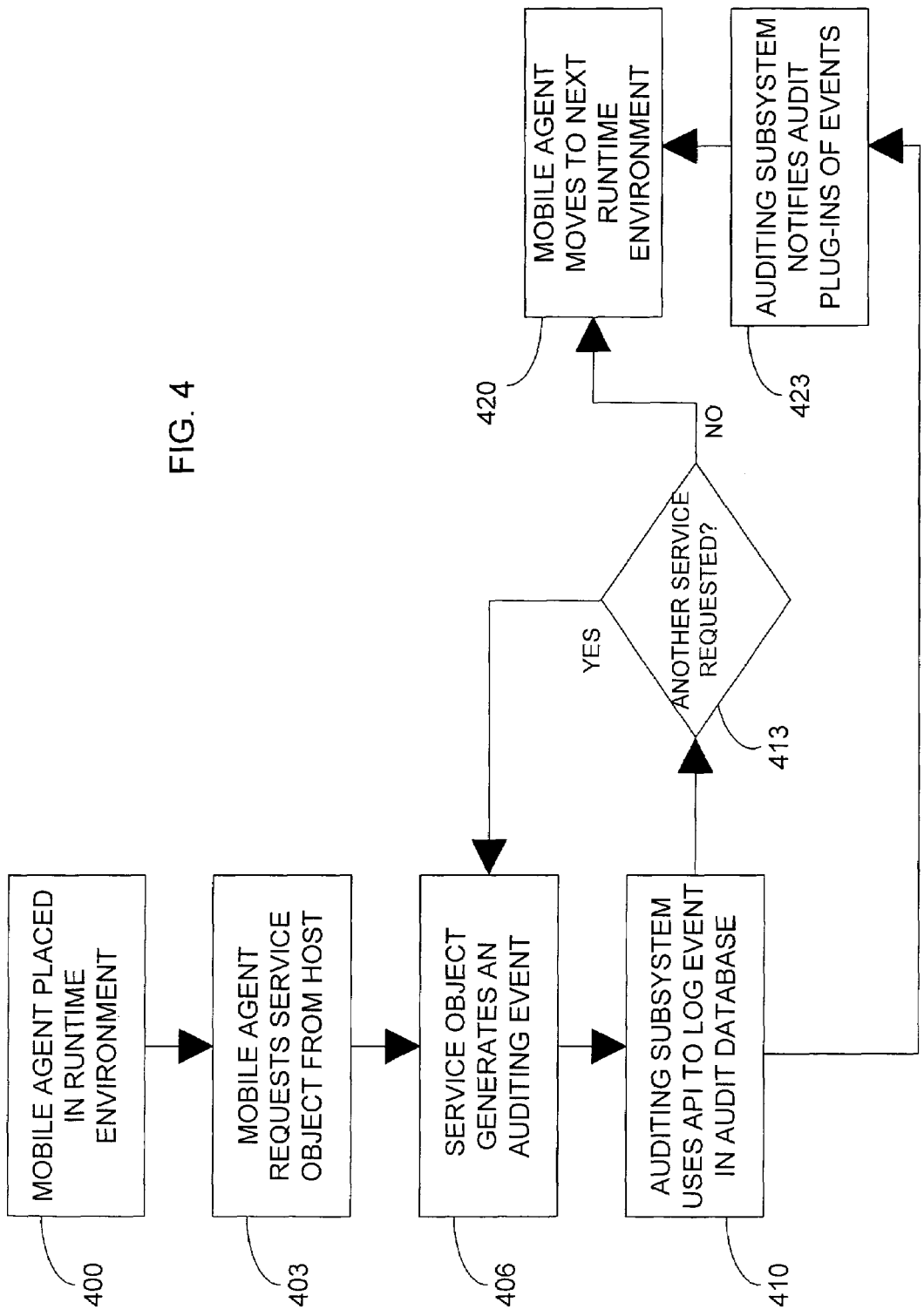
FIG. 4 is a flow diagram of a method for auditing the activity of a mobile agent object according to an embodiment of the invention.

FIG. 4 is a flow diagram of a method for auditing the activity of a mobile agent object according to an embodiment of the invention. As described above with respect to the method shown in FIG. 3, a mobile agent object is instantiated in a mobile-agent runtime environment 200 at step 400 and the mobile agent object then requests a service object from the host-computing environment at step 403. The requested object may be a directory service object 205 wherein the mobile agent object is requesting a service listing as described above or the requested object may be any other service object 207 or process requested directly from the host-computing environment with out checking the directory service object 205 to see if the requested service object 207 will be available.

When an object is requested within either a service object 207 or the directory service object 205 by a mobile agent object, the requested object generates auditing events and uses the auditing subsystem 220 to keep track of requested objects. As such, when an object is requested, an API 221 corresponding to the auditing subsystem 220 starts the event process, at step 410. The auditing subsystem 220 then logs the event into the audit database 230. Additionally, the auditing subsystem 220 sends a notification event to each of the auditing plugins 225, at step 423. The auditing plugins 225 may then use the API 221 of the auditing subsystem 220 to access the new data now stored in the audit database 230.

If another service is requested (step 413), the process described above may repeat. If no other services are to be requested by the mobile agent object, the mobile agent object may then terminate execution or move on to another mobile-agent runtime environment 200, which may be the environment from which it came, at step 420.

The preceding discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

I claim:

1. A method for a mobile agent object to discover services available in a host-computing environment, the method comprising:

the mobile agent object migrating from a first electronic device to a second electronic device comprising the host environment, the mobile agent object configured to execute in the first electronic device, halt execution in the first electronic device at an execution state, be transplanted to the second electronic device, and resume execution from the execution state in the second electronic device;

after the mobile agent object migrates to the second electronic device, the mobile agent object requesting a service listing from the host environment;

the host environment returning a service listing to the mobile agent object in response to the request for the service listing;

the mobile agent object determining if a particular service is within the returned service listing;

the mobile agent object requesting the particular service if the particular service is determined by the mobile agent object to be within the returned service listing;

an audit system generating an audit event in response to the request for the particular service; and the audit system logging the audit event in a database.

2. The method of claim 1, further comprising the mobile agent object moving to a computing environment other than the host-computing environment in response to determining that the particular service is not within the returned service listing.

3. The method of claim 1, further comprising the host environment providing the particular service to the mobile agent object; and the mobile agent object incorporating the particular service.

4. The method of claim 3, further comprising the mobile agent object moving to a computing environment other than the host-computing environment in response to incorporating the particular service.

5. The method of claim 3, further comprising
the mobile agent object determining if a second particular service is within the returned service listing;
the mobile agent object requesting the second particular service if the second particular service is determined by the mobile agent object to be within the returned service listing;
the host environment providing the second particular service to the mobile agent object; and
the mobile agent object incorporating the second particular service.

6. The method of claim 3 wherein the incorporated service comprises data.

7. The method of claim 3 wherein the incorporated service comprises a process.

8. The method of claim 1, further comprising the audit system notifying at least one audit plug-in in response logging the audit event.

9. The method of claim 8, further comprising the audit plug-in retrieving data from the database in response to the notifying.

10. The method of claim 1, wherein the generating an audit event comprises communicating with a processor in the host-computing environment using an application program interface.

11. The method of claim 1, further comprising:
the audit system detecting a second request for a service by a mobile agent object;
the audit system generating a second audit event in response to detecting the second request; and
the audit system logging the second audit event in a database.

12. The method of claim 1, further comprising:
the host-computing environment providing the particular service to the mobile agent object; and
the mobile agent object incorporating the particular service.

13. A computer system for hosting a mobile agent object having discovery ability, the computer system comprising:
a processor configured to facilitate communications between computer systems coupled by a network; and
a memory coupled to the processor, the memory comprising:
a mobile-agent runtime environment configured to host a mobile agent object after the mobile agent object migrates to the computer system, the mobile agent object configured to execute in a first electronic device, halt execution in the first electronic device at an execution state, be transplanted to the computer system, and resume execution from the execution state in the computer system;
a discovery service object configured to list service objects available to the mobile agent object in response to a discovery request from the hosted mobile agent object;
at least one service object configured to interact with the mobile agent object in response to a request for the at least one service object by the mobile agent object; and an audit system within the mobile-agent runtime environment configured to generate an audit event in response to the request for the at least one service object and log the audit event in a database.

14. The system of claim 13, further comprising an injector process within the memory, the injector process configured to launch the mobile agent object in the mobile agent runtime environment.

15. The system of claim 13 wherein the at least one service object comprises data.

16. The system of claim 13 wherein the at least one service object comprises a process.

17. The system of claim 13 wherein the at least one service object comprises a second mobile agent object.

18. The system of claim 13 wherein the at least one service object comprises a second discovery service object.

19. A system for auditing the activity of a mobile agent object in a host-computing environment, the system comprising:
a processor configured to facilitate communications between the host-computing environment and other computing environments coupled by a network; and
a memory coupled to the processor, the memory comprising:
a first mobile-agent runtime environment configured to host a mobile agent object after the mobile agent object migrates to the first mobile-agent runtime environment from one of the other computing environments, the mobile agent object configured to execute in one of the other computing environments, halt execution in one of the other computing environments at an execution state, be transplanted to the first mobile-agent runtime environment, and resume execution from the execution state in the first mobile-agent runtime environment;
a discovery service object configured to list service objects available to the mobile agent object in response to a discovery request from the hosted mobile agent object;
at least one service object configured to interact with the mobile agent object in response to a request for the at least one service object by the mobile agent object;
an audit system configured to detect the request for the at least one service object by the hosted mobile agent object in the first mobile-agent runtime environment; and
an audit database configured to log the request for the at least one service object by the mobile agent object in response to the audit system detecting the request.

20. The system of claim 19 wherein the audit system is configured to generate a notification in response to detecting of the request.

21. The system of claim 20, further comprising at least one audit plug-in configured to retrieve data from the audit database in response to a notification from the audit system.

22. The system of claim 19, further comprising a network interface controller configured to facilitate the movement of the mobile agent object from the first mobile-agent runtime environment to a second mobile-agent runtime environment.

23. The system of claim 22 wherein the second mobile-agent runtime environment resides in a memory of one of the other computing environments.

24. The system of claim 22 wherein the second mobile-agent runtime environment resides in a second memory in the host-computing environment.

25. The system of claim 22 wherein the second mobile-agent runtime environment resides in a portion of the memory in the host-computing environment other than the portion of the memory where the first mobile-agent runtime environment resides.

26. A system for hosting a mobile agent object having discovery ability, the system comprising:
a first host-computing environment comprising:
a first processor configured to facilitate communications to and from a computer network; and
a first memory coupled to the first processor, the first memory comprising:
a first mobile-agent runtime environment configured to host a mobile agent object after the mobile agent object migrates to the first host-computing environment, the mobile agent object configured to execute in a first electronic device, halt execution in the first electronic device at an execution state, be transplanted to a second electronic device, and resume execution from the execution state in the second electronic device;
a first discovery service object having an application programming interface for communicating with the first processor in response to a discovery request from the mobile agent object and to return a listing of available service objects to the mobile agent object in response to the discovery request;
a first service object within the first mobile-agent runtime environment configured to interact with the mobile agent object in response to a request for the first service object by the mobile agent object based on the returned listing;
an audit system configured to generate an audit event in response to the request for the first service object and log the audit event in a database, and
a second host-computing environment coupled to the first host-computing environment by the computer network, the second host-computing environment comprising:
a second processor configured to facilitate communications to and from the first host-computing environment; and
a second memory coupled to the second processor, the second memory comprising:
a second mobile-agent runtime environment configured to host the mobile agent object after the mobile agent object migrates to the second host-computing environment;
a second discovery service object having an application programming interface for communicating with the second processor in response to a discovery request from the mobile agent object; and
a second service object within the second mobile-agent runtime environment configured to interact with the mobile agent object in response to a request for the second service object by the mobile agent object.

27. A memory having stored thereon instructions that when executed by a computing device perform the steps of:
receiving from a mobile agent object a request for a service listing after the mobile agent object migrates to the computing device, the mobile agent object configured to execute in a first electronic device, halt execution in the first electronic device at an execution state, be transplanted to a second electronic device, and resume execution from the execution state in the second electronic device;
returning a service listing to the mobile agent object in response to the request for the service listing;
receiving from the mobile agent object a request for a particular service listed in the returned service listing;
generating an audit event in response to the request for the particular service; and
logging the audit event in a database.

* * * * *

UNITED STATES PATENT AND TRADEMARK OFFICE
CERTIFICATE OF CORRECTION

PATENT NO. : 7,614,059 B2  Page 1 of 1
APPLICATION NO. : 10/617604
DATED : November 3, 2009
INVENTOR(S) : Michael R. Manzano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Nineteenth Day of October, 2010

David J. Kappos
*Director of the United States Patent and Trademark Office*